Dec. 7, 1926.

F. A. MARSH 1,609,911

WATER GAUGE AND TEMPERATURE INDICATOR

Filed July 30, 1924

Inventor

Frederick A. Marsh

By

Eccleston & Eccleston,
Attorneys

Patented Dec. 7, 1926.

1,609,911

UNITED STATES PATENT OFFICE.

FREDERICK A. MARSH, OF COLUMBUS, OHIO.

WATER GAUGE AND TEMPERATURE INDICATOR.

Application filed July 30, 1924. Serial No. 729,121.

The present invention relates to a water gauge and temperature regulator and more particularly to such a device for use in connection with automobile radiators.

An object of this invention is to generally improve water gauges and temperature indicators, and especially to simplify the construction shown in my pending application #666,380, filed October 3, 1923.

Other objects and advantages of the invention will be apparent from the following description when taken in connection with the accompanying drawings, in which—

Figure 1:
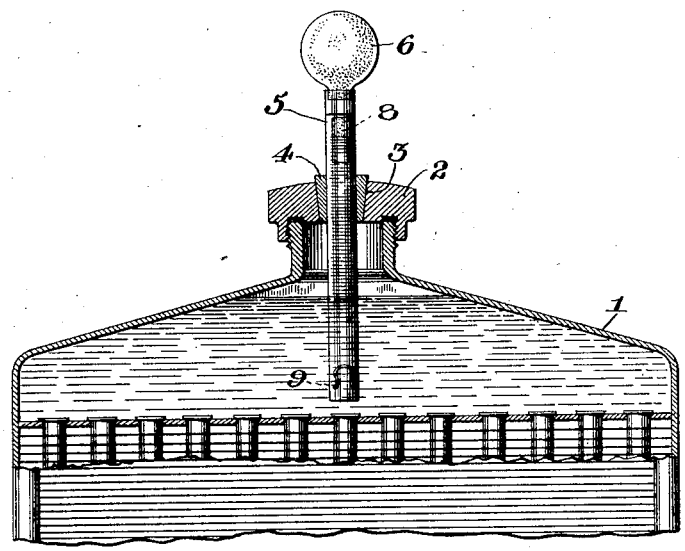
Figure 1 is a fragmentary vertical section through an automobile radiator showing one form of the invention.

Referring to the drawings in more detail, the numeral 1 indicates an automobile radiator provided with a cap 2 which is apertured as indicated at 3 for the reception of a stopper or plug 4 of suitable material.

Figure 3:
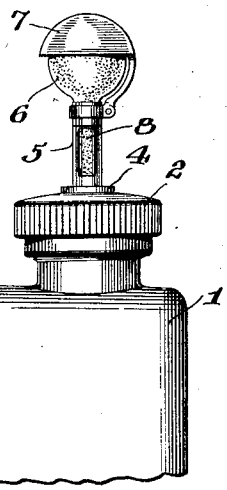
Figure 3 is a fragmentary side elevation of an automobile showing the water gauge and guard attached.

The gauge tube 5, preferably of uniform diameter, is made of glass or other transparent material and is mounted within the stopper 4. This tube is of such length as to have its lower end submerged to a considerable depth in the water of the radiator and its upper end extending beyond the top of the cap 2. An air bulb 6 is mounted on the upper end of the tube for the purpose of drawing water into the latter, and a guard 7 may be also mounted on the tube 5 so as to extend over and protect the bulb if found desirable. This guard is clamped to the upper end of the tube 5 as indicated in Figure 3.

In order that the presence of the water in the tube 5 may be readily indicated to the driver of the automobile, I have provided a cylindrical float 8 (Figs. 1, 2, and 3) which will be clearly visible through the walls of the transparent tube 5. A spring clip 9 may be positioned within the lower end of the tube 5 for the purpose of retaining the float within the tube in case the water in the radiator falls below the lower end of the tube.

Figure 4:
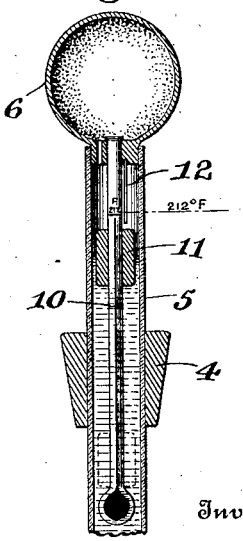
Figure 4 is a longitudinal section showing the water gauge and thermometer combined.

In that form of the invention shown in Figure 4, the tube 5, air bulb 6 and stopper 4 are identical with those elements previously described. The modified form of the invention however, is provided with means to indicate the temperature of the water in the radiator. To this end a thermometer 10 is secured within the lower portion of the bulb 6 and extends longitudinally of the tube 5 so as to be partly immersed in the water therein. The float 11 surrounds the thermometer and the bulb on the lower end of the latter may be somewhat enlarged to provide a limit for the downward movement of the float. The thermometer or tube may be marked to indicate the boiling point (212° F.) and may bear other indicia if desired. In order that the float 11 may not conceal the top of the thermometer, especially when at the boiling point, a rod or pin 12 is provided. This pin is secured in the base of the bulb 6 and extends downwardly to a point slightly below the boiling point on the thermometer 10, thus forming an abutment against farther rise of the float.

While a thermometer is shown only in that form of the invention disclosed in Figure 4 of the drawing, it will be apparent that a thermometer may also be employed in conjunction with the form shown in Figures 1, 2, and 3 by merely inserting the same through the plug 4 or cap 2 so as to be positioned in the air space below the latter in the well-known manner.

Figure 2:
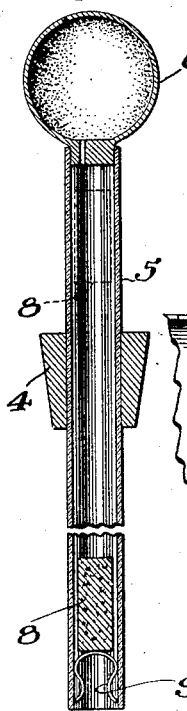
Figure 2 is a vertical section through the water gauge per se.

In the operation of the device the radiator being filled with water as indicated in Figure 1, the cap 2 is put in place upon the radiator neck and the bulb 6 squeezed so as to eject all air therefrom; upon release of the bulb 6 atmospheric pressure will cause the water from the radiator to extend upwardly into the tube 5 thereby raising the float 8 to a point within the tube 5 visible above the cap 2. As long as the water in the radiator remains above the lower end of the tube 5 this float 8 or 11 will remain visible through the glass tube, but as soon as the water drops below the lower end of the tube the water in the tube will discharge therefrom and the float will drop down onto the spring clip 9. As the water in the radiator becomes heated due to the operation of the engine the thermometer will, of course, register its temperature which will also be visible through the walls of the transparent tube.

From the foregoing description taken in connection with the accompanying drawings it will be apparent that I have devised an extremely simple yet efficient means for raising and displaying the water in an automobile radiator, and also for indicating accurately the temperature of the engine through the medium of the water in the radiator.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claim.

Having fully described the invention, what I claim as new and desire to secure by Letters Patent is:

The combination with a radiator cap, of a transparent tube of uniform and substantial diameter mounted therein, and normally communicating with the water in the radiator, a flexible bulb at the upper end of said tube for drawing water into the latter, and a pivotally mounted guard for said bulb.

FREDERICK A. MARSH.